Feb. 11, 1941.  E. E. TOUROT  2,231,098
CULINARY UTENSIL
Filed Nov. 5, 1938
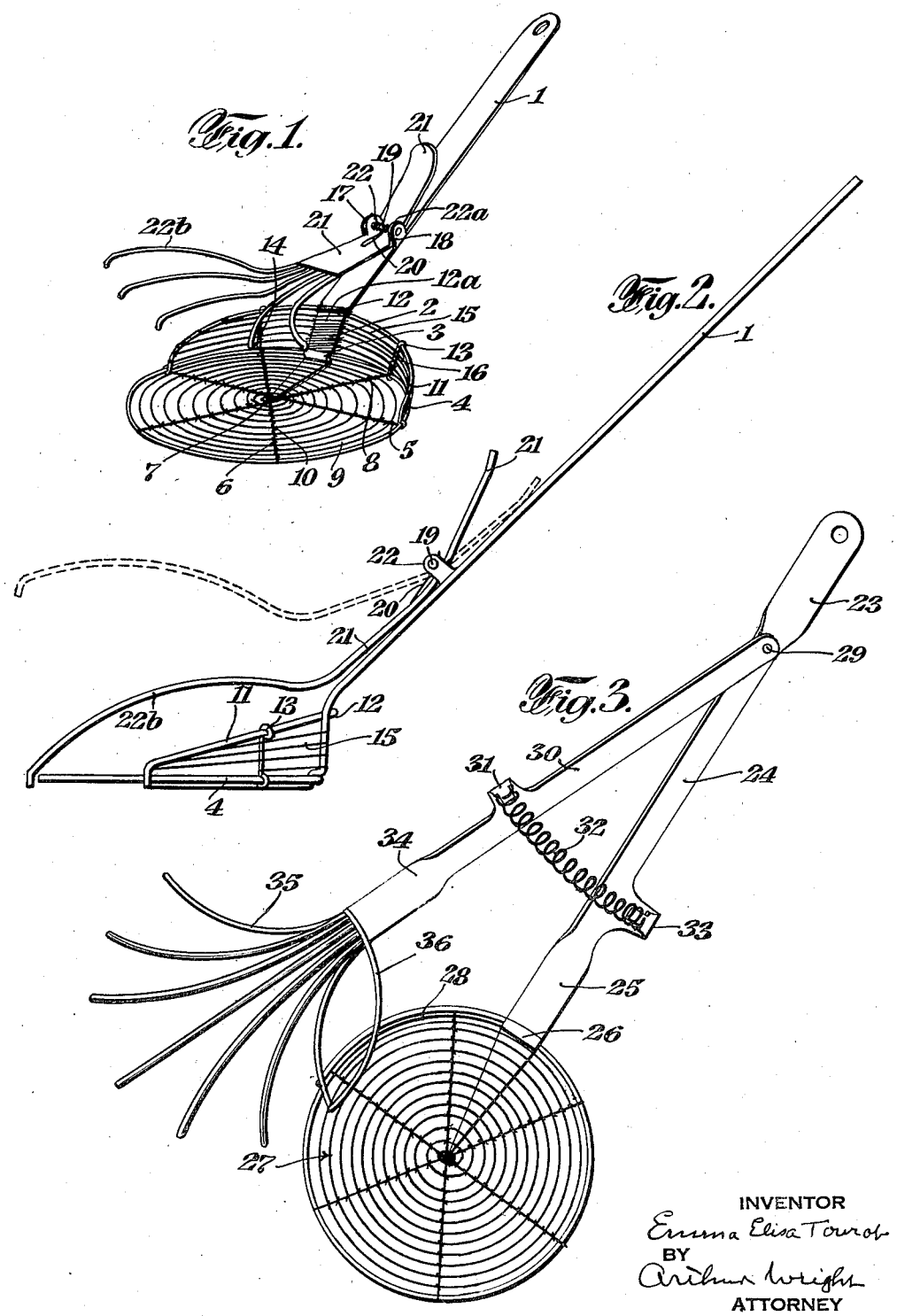
INVENTOR
Emma Elisa Tourot
BY
Arthur Wright
ATTORNEY Patented Feb. 11, 1941

2,231,098

UNITED STATES PATENT OFFICE 2,231,098

CULINARY UTENSIL

Emma Elisa Tourot, New York, N. Y.

Application November 5, 1938, Serial No. 239,049

10 Claims. (Cl. 294—50.9)

My invention relates particularly to utensils designed to be used in connection with cooking operations.

The object of my invention is to provide a utensil for lifting food articles in connection with the cooking thereof, such as vegetables, meat, fish, etc. The purpose is to provide an advantageous device which will enable the food article to be lifted out of pots and pans so that liquids can be readily drained therefrom while the food article is firmly held, so that thereby the latter can be transferred from the pots and pans to dishes or vice versa. Further objects of my invention will appear from the detailed description thereof hereinafter.

While my invention is capable of embodiment in many different forms, for the purpose of illustration I have shown only certain forms thereof in the accompanying drawing, in which—

Fig. 1 is a perspective view of one form of my invention;

Fig. 2 is a side elevation thereof; and

Fig. 3 is a plan view of a modified form of my invention.

Referring first to Figs. 1 and 2, I have shown a utensil comprising a metal handle 1 having a downwardly bent lower end 2 provided with a cylindrical turn 3 around a circumferential wire 4. The wire 4 supports across the diameter thereof a wire 5 which is turned over at its ends around the wire 4. A wire 6 is bent to form two radiating arms and its ends turn around the circumferential wire 4 while the middle of the wire 6 is secured to the wire 5 by a binding wire 7. Another wire 8, similar to the wire 6, is located on the other side of the wire 5 in the same manner as the wire 7. In this way there are formed six equally spaced radial wire arms which support a spiral wire 9 and which can be fastened to the said six arms by a spiral wrapping 10 of a small wire, the wrappings of which encircle the respective arms and the adjacent spiral wire 9. A semi-circumferential wire 11 has its ends wrapped around the circumferential wire 4 and its middle portion is secured to the handle 1 by wrappings 12 of a small wire 12a. Uprights 13 and 14 have their ends bent around the circumferential wire 4 and the semi-circumferential wire 11 and guard wires 15 are attached to the uprights 13 and 14 and the ends of the semi-circumferential wire 11 by wrappings of smaller wires 16. The handle 1 has two ears 17 and 18 carrying a pin 19 and a spring 20 for pivotally supporting a lever arm 21 having ears 22 and 22a through which the pin 19 passes so that the lever arm 21 is normally pressed downwardly until a series of rounded claw-fingers 22b, attached to the lever arm 21, contact with and extend over the edges of the circumferential wire 4 and until the figures 22b have substantially the same inclination as the guard wire 11, as shown in Fig. 2.

In Fig. 3 I have shown a modified form of my invention comprising a metal handle 23 having at its middle 24 a 45° angle twist connecting a lower portion 25 with the part 23 thereof. The lower part 25 of the handle has a downwardly inclined bend 26, as in the case of Fig. 1, to which there is attached a lifter or basket 27 made exactly as shown in Fig. 1 except that in this instance a quarter-circumference wire 28 is provided, occupying just half the length of the wire 11 shown in Fig. 1 and extending from the portion 26 of the handle 90° around the side of the lifter 27. On the portion 24 of the handle 23 there is a pivot pin 29 to which there is attached a supplemental metal handle 30 parallel to the part 24 and having a spring supporting ear 31 carrying a coil spring 32, which, at the other end, is supported in an ear 33 on the part 24. The said supplemental handle 30 has a portion 34 at 45° to the part 30, the part 34 being parallel to the part 25 when the utensil is in closed position. The part 34, furthermore, has attached to it a series of claw fingers 35 shaped like the fingers 22b in Fig. 1, and in addition a guard finger 36 which, when the part 34 overlies the part 25, occupies the complementary position to the wire 28, that is to say corresponding in position to the remaining half of the wire 11 so that the wire 28 and the finger 36, together in closed position of the device, occupy the same position substantially as the wire 11.

In the operation of the form of my invention shown in Figs. 1 and 2, the article of food may be lifted out of a pot or pan while the lever 21 is in lifted position, by pressing the upper end thereof downwardly with the thumb while the utensil is being held by the handle 1. The article of food can thus be grasped by releasing the lever 21 and the liquid, such as water, fat, etc., can be drained from the article of food after it has been lifted out of its original receptacle and the article of food can then be transferred to the appropriate dish by pressing down the upper end of the lever 21 to release the article of food, whether vegetable, fish, meat, etc., thus securing adequate draining in transferring the article of food to the desired dish without dropping or breaking the article of food.

The modification of the invention shown in Fig. 3 operates in a somewhat similar manner except that in this instance, in lifting the article of food out of the pot or pan the upper member of the device is normally moved out of the way in such a position as to permit the lifter 27 to extend under the article of food in the normal position of about 45° from the horizontal, at which time the upper member, comprised of the claw fingers 35, will be directly over the lifter 27 due to the 45° inclination from the lifter 27 at this time. Furthermore, it will be seen that the quarter-circumference guard 28 is at this time above the article of food. As the latter is lifted out of the receptacle the fingers 35 will be moved downwardly by compressing the spring 32 until the claw fingers 35 overlie and grasp the article of food and until the guard arm 36 occupies the complementary position to the quarter-circumference guard 28. In this position the article of food will be firmly grasped so as to permit the draining and can be transferred to the particular dish without dropping or breaking the article of food grasped thereby. In order to release the latter it is merely necessary to release the pressure on the spring 32 by the hand which is grasping the member 33.

While I have described my invention above in detail I wish it to be understood that many changes will be made therein without departing from the spirit of the same.

I claim:

1. A culinary utensil comprising a handle, a lifter element attached thereto, a guard attached to the lifter, occupying a part of the circumference of the latter, and a manually operable lever arm attached to the handle and having a grasping element in the form of a series of claw-fingers adapted to cooperate with the guard in the lifting by the lifter so that the fingers take the inclination of the top of the guard in the lowered position of the fingers.

2. A culinary utensil comprising a handle, a lifter element attached thereto, an inclined guard attached to the lifter, occupying a part of the circumference of the latter, and a manually operable lever arm attached to the handle and having a grasping element in the form of a series of claw-fingers adapted to cooperate with the guard in the lifting by the lifter so that the claws of the fingers extend over the edge of the lifter and the fingers take the inclination of the top of the guard in the lowered position of the fingers.

3. A culinary utensil comprising a handle, a lifter element attached thereto, a semi-circumferential inclined guard attached to the lifter, occupying a part of the circumference of the latter, and a manually operable lever arm attached to the handle and having a grasping element in the form of a series of claw-fingers adapted to cooperate with the guard in the lifting by the lifter so that the claws of the fingers extend over the edge of the lifter and the fingers take the inclination of the top of the guard in the lowered position of the fingers.

4. A culinary utensil comprising a handle, a lifter element attached thereto, a guard attached to the lifter, occupying a part of the circumference of the latter, and a manually operable lever arm attached to the handle and having a grasping element in the form of a series of claw-fingers adapted to cooperate with the guard in the lifting by the lifter, the lever and handle being pivoted so that the lever arm rotates in a plane located at an acute angle to the plane of the lifter.

5. A culinary utensil comprising a handle, a lifter element attached thereto, a guard attached to the lifter, occupying a part of the circumference of the latter, and a manually operable lever arm attached to the handle and having a grasping element in the form of a series of claw-fingers adapted to cooperate with the guard in the lifting by the lifter, the lever and handle being pivoted so that the lever arm rotates in a plane located at an angle of approximately 45° to the plane of the lifter.

6. A culinary utensil comprising a handle, a lifter element attached thereto, a guard attached to the lifter, occupying a part of the circumference of the latter, and a manually operable lever arm attached to the handle and having a grasping element in the form of a series of claw-fingers adapted to cooperate with the guard in the lifting by the lifter, the lever and handle being pivoted so that the lever arm rotates at an angle to the plane of the lifter, said guard extending around a quarter-circumference of the lifter at one side only of the handle.

7. A culinary utensil comprising a handle, a lifter element attached thereto, a guard attached to the lifter, occupying a part of the circumference of the latter, and a manually operable lever arm attached to the handle and having a grasping element in the form of a series of claw-fingers adapted to cooperate with the guard in the lifting by the lifter, the lever and handle being pivoted so that the lever arm rotates in a plane located at an acute angle to the plane of the lifter, said guard extending around a quarter-circumference of the lifter at one side only of the handle, the said grasping element comprising a series of fingers, one of which occupies the complementary position to the guard in relation to the handle on the other side of said handle.

8. A culinary utensil comprising a handle, a lifter element attached thereto, a guard attached to the lifter, occupying a part of the circumference of the latter, and a manually operable spring pressed lever arm attached to the handle and having a grasping element in the form of a series of claw-fingers adapted to cooperate with the guard in the lifting by the lifter, the lever and handle being pivoted so that the lever arm rotates in a plane located at an acute angle to the plane of the lifter, said guard extending around a quarter-circumference of the lifter at one side only of the handle, the said grasping element comprising a series of fingers, one of which occupies the complementary position to the guard in relation to the handle on the other side of said handle.

9. A culinary utensil comprising a handle, a lifter element attached thereto, and a manually operable lever arm attached to the handle and having a grasping element in the form of a series of claw-fingers, the lever and handle being pivoted so that the lever arm rotates in a plane located at an acute angle to the plane of the lifter.

10. A culinary utensil comprising a handle, a lifter element attached thereto, a guard attached to the lifter, occupying a part of the circumference of the latter, and a manually operable lever arm attached to the handle and having a grasping element in the form of a series of claw-fingers adapted to cooperate with the guard in the lifting by the lifter, the lever and handle being pivoted so that the lever arm rotates in a plane located at an acute angle to the plane of the lifter, said guard extending around a quarter-circumference of the lifter at one side only of the handle, the said grasping element comprising a series of fingers, one of which occupies the complementary position to the guard in relation to the handle on the other side of said handle and is adapted to be moved into a position above the guard upon the rotating of the lever.

EMMA ELISA TOUROT.